US010795986B2

(12) United States Patent
Louco et al.

(10) Patent No.: US 10,795,986 B2
(45) Date of Patent: Oct. 6, 2020

(54) METHOD AND SYSTEM FOR AUTHENTICATING A COMPONENT IN A POWER CONVERTER

(71) Applicant: GE Energy Power Conversion Technology Limited, Rugby, Warwickshire (GB)

(72) Inventors: Lathom Alexander Louco, Salem, VA (US); Nathaniel Robert Michener, Salem, VA (US)

(73) Assignee: GE ENERGY POWER CONVERSION TECHNOLOGY LIMITED, Warwickshire (GB)

( * ) Notice: Subject to any disclaimer, the term of this patent is extended or adjusted under 35 U.S.C. 154(b) by 201 days.

(21) Appl. No.: 15/893,834

(22) Filed: Feb. 12, 2018

(65) Prior Publication Data

US 2019/0251247 A1 Aug. 15, 2019

(51) Int. Cl.
| G06F 21/31 | (2013.01) |
| G06F 21/36 | (2013.01) |
| G06F 21/44 | (2013.01) |
| G06F 21/75 | (2013.01) |
| G06F 21/73 | (2013.01) |
| G06F 21/62 | (2013.01) |

(52) U.S. Cl.
CPC .......... G06F 21/44 (2013.01); G06F 21/6209 (2013.01); G06F 21/73 (2013.01); G06F 21/755 (2017.08)

(58) Field of Classification Search
CPC ...... G06F 21/44; G06F 21/73; G06F 21/6209; G06F 21/755

USPC ......................................................... 726/19
See application file for complete search history.

(56) References Cited

U.S. PATENT DOCUMENTS

| 9,080,894 | B2 | 7/2015 | Spanier et al. |
| 9,142,066 | B2 | 9/2015 | Chen et al. |
| 9,563,673 | B2 | 2/2017 | Jin et al. |
| 9,594,653 | B1 | 3/2017 | Misra et al. |
| 9,697,241 | B1 | 7/2017 | Mistry et al. |
| 2007/0282827 | A1* | 12/2007 | Levin ................ G06F 16/285 |
| 2011/0223868 | A1* | 9/2011 | Kojima ............. G07C 9/00309 |
| | | | 455/67.11 |

(Continued)

FOREIGN PATENT DOCUMENTS

WO 2002013445 A2 2/2002

*Primary Examiner* — Haresh N Patel
(74) *Attorney, Agent, or Firm* — Wood IP LLC

(57) ABSTRACT

There are provided methods and apparatuses for authenticating components in an electric machine. For example, there is provided a method for authenticating parts of an electric machine. The method includes fetching, using a controller, identification data associated with a set of parts and performing a first verification step on the identification data, for each part in the set. The method further includes performing a second verification step on the identification data, in response to the first verification step being successful. The second verification step includes comparing the identification data with data from a database that includes identification information associated with manufactured parts. Furthermore, the method includes, in response to one of the first verification step and the second verification step being unsuccessful, a command to disable the electric machine.

20 Claims, 5 Drawing Sheets

(56) References Cited

U.S. PATENT DOCUMENTS

| | | | | |
|---|---|---|---|---|
| 2012/0030270 A1* | 2/2012 | Shokrollahi | .......... | H04L 9/3278 |
| | | | | 708/802 |
| 2012/0166248 A1* | 6/2012 | Silberstein | ............. | G06Q 10/06 |
| | | | | 705/7.28 |
| 2013/0079959 A1* | 3/2013 | Swanson | ................. | B61C 17/12 |
| | | | | 701/19 |
| 2013/0301755 A1* | 11/2013 | Zoels | ...................... | H03K 17/18 |
| | | | | 375/316 |
| 2014/0155015 A1* | 6/2014 | Wu | ...................... | H05K 1/0243 |
| | | | | 455/337 |
| 2014/0253007 A1* | 9/2014 | Shokrollahi | ............ | H02P 23/14 |
| | | | | 318/490 |
| 2016/0118896 A1* | 4/2016 | Walker | .............. | H02M 3/33507 |
| | | | | 363/21.12 |
| 2016/0254753 A1* | 9/2016 | Malinin | ............ | H02M 3/33507 |
| | | | | 363/21.16 |
| 2017/0104410 A1* | 4/2017 | Zeng | ........................ | H01F 27/24 |
| 2018/0001774 A1* | 1/2018 | Murata | ................... | H02J 7/007 |
| 2018/0248505 A1* | 8/2018 | Itoigawa | ................ | G05B 15/02 |
| 2018/0299370 A1* | 10/2018 | Preischel | ................ | H05K 1/142 |
| 2018/0337587 A1* | 11/2018 | Mari Curbelo | ......... | H02M 1/08 |
| 2019/0251247 A1* | 8/2019 | Louco | ..................... | G06F 21/44 |

* cited by examiner

US 10,795,986 B2

METHOD AND SYSTEM FOR AUTHENTICATING A COMPONENT IN A POWER CONVERTER

I. TECHNICAL FIELD

The present disclosure relates to power conversion systems and their components. More particularly, the present disclosure relates to methods and systems for authenticating one or more components in a power converter.

II. BACKGROUND

Counterfeiting electronics parts for use as replacement parts is becoming an important issue for manufacturers as counterfeited or unauthorized parts can lead to significant loss of revenue. For example, and not by limitation, the least replaceable unit (LRU) in a wind turbine power converter is a phase module. Components of the phase module include a heatsink, insulated-gate bipolar transistors (IGBTs), and various circuit boards. A phase module can fail in the field, and when this happens, it must be replaced. Replacing a failed phase module LRU with a counterfeited or an unauthorized part not only leads to a loss of revenue for the converter's manufacturer, but it can also lead to decreased reliability as non-authorized parts may not work according to the specifications of the power converter.

III. SUMMARY

The embodiments described herein feature an identification method and an application-specific controller that is configured to verify whether a power converter is utilizing original equipment manufacturer (OEM) components, and in the case that one or more component is found to be unauthorized, to prevent usage of the power converter. As such, the embodiments ensure power converter reliability, by allowing only OEM parts to be used. Reliability is increased because OEM parts are designed to perfectly match the specifications of the power converter, which is not always achievable with third-party or non-authorized components. Furthermore, reworked phase modules may have been damaged during rework or handling, which could also cause faulty operation.

One exemplary embodiment provides a method for authenticating parts in an electric machine. The method includes fetching, using a controller, identification data associated with a set of parts. The method further includes performing a first verification step on the identification data, for each part in the set. The method includes performing a second verification step on the identification data, in response to the first verification step being successful. The second verification step includes comparing the identification data with data from a database that includes information associated with components of the electric machine, which may be from a manufacturer. This information may be collected and placed in the database when each LRU is assembled. Furthermore, the method includes, in response to one of the first verification step and the second verification step being unsuccessful, issuing (by the controller) a command to disable the electric machine.

Another example embodiment may be a controller configured to authenticate components in an electric machine. The controller may include a processor and a memory including instructions that, when executed by the processor, cause the processor to perform certain operations. The operations can include fetching identification data associated with a set of parts and performing a first verification step on the identification data, for each part in the set. The operations can further include performing a second verification step on the identification data, in response to the first verification step being successful. The second verification step can include comparing the identification data with data from a database including information associated with components of the electric machine. In some embodiments, the identification data may be compared with expected groupings of components. Furthermore, the operations can include, in response to one of the first verification step and the second verification step being unsuccessful, issuing a command to disable the electric machine.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

IV. BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

V. DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

Figure 1A:
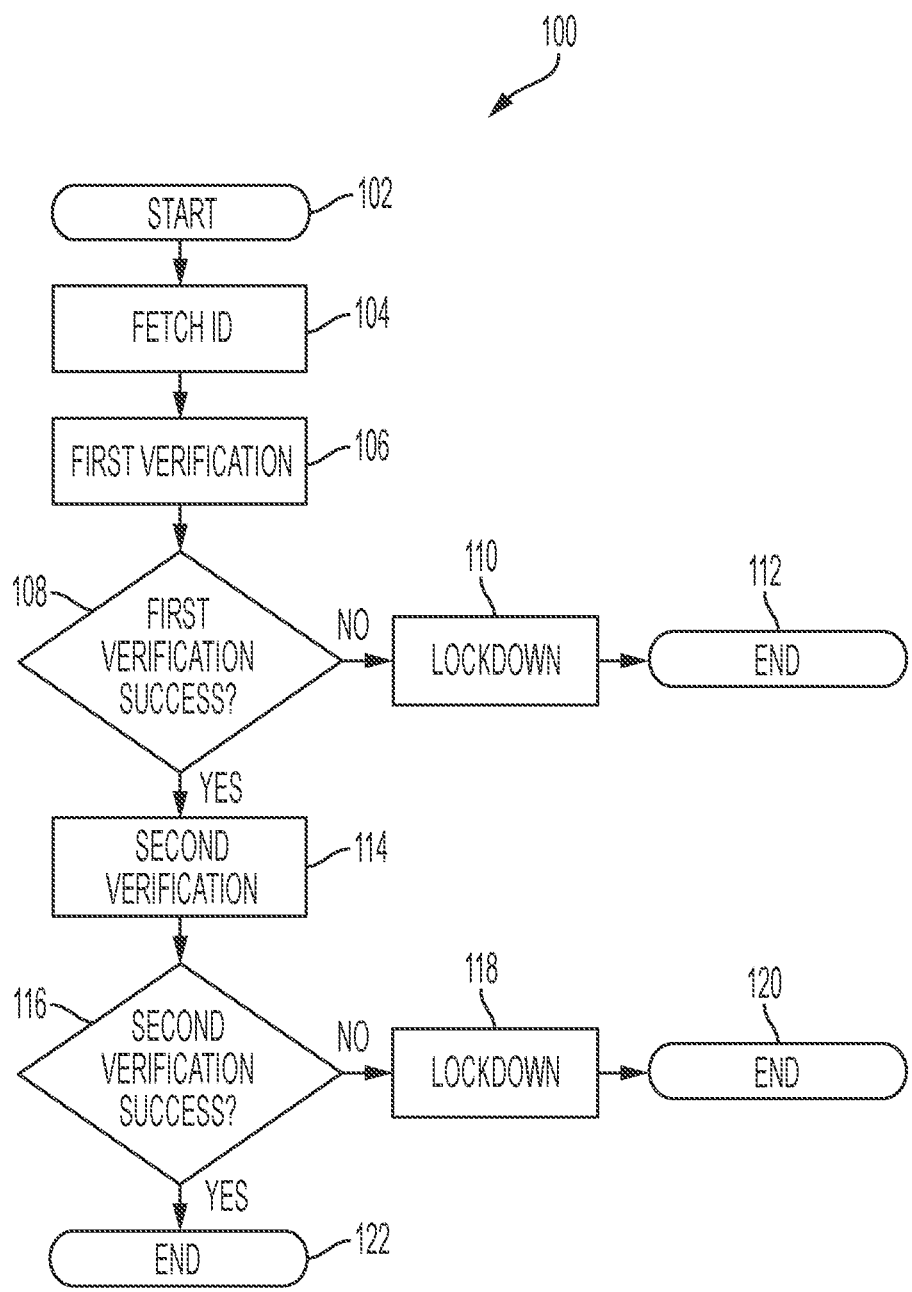
FIG. 1A depicts a flow chart in accordance with several aspects described herein.

FIG. 1A illustrates a flow chart of a method 100 that can be executed by a controller communicatively coupled with an electric machine, according to an embodiment. The method 100 may be used to authenticate one or more components in the electric machine, such as a power converter. The method 100 begins at step 102, and it includes fetching, by the controller and at step 104, identification data associated with one or more components. For example, a power converter component, such as an LRU (e.g. a phase module) may include a first gate driver printed circuit board (PCB), a second gate driver PCB, and a gate interface PCB.

Each PCB may include its own memory chip holding identification data for that specific board.

As such, at step 104, the method 100 includes the controller querying a memory of each of these PCBs to retrieve identification data. In one embodiment, the identification data of each PCB may be a string that includes a serial number, a batch number, a commissioning date, a combination thereof, and/or any other information that is pertinent to the PCB's commissioning in the power converter.

The method 100 then includes verifying the authenticity of the retrieved identification data, for each PCB, at step 106. This first verification step may include searching a database that is pre-loaded with identification data of a plurality of PCBs. As such, if the retrieved identification data is not found in the database (NO at step 108), the controller can issue a lockdown command sequence or a shutdown sequence (step 110) to lock or to prevent usage of the power converter because the components have failed the first verification step 106. In that case, the method 100 ends at step 112.

While the first verification step 106 is described above as finding a database entry in the database that corresponds to the retrieved identification data, in some embodiments, the first verification step 106 may include additional verification steps. For example, the first verification step may include checking a string length or a board ID, even prior to checking whether the retrieved information data is in the database. As such, if some basic format of the retrieved identification does not match with a predetermined format that is anticipated, the first verification step fails, even without checking the database. Other additional layers of verification can be added to the first verification step without departing from the scope of the present disclosure. The first-line checks can be implemented in firmware, and once they pass, the database can be queried and searched.

When the first verification step 106 succeeds (YES at step 108) for each of the PCBs, the method 100 moves to a second verification step 114 whose purpose is to determine whether the combination of PCBs, as represented by the combination of their respective identification data, is authentic. In other words, the second verification step 114 checks whether the database includes information that indicates that the PCBs whose identification were retrieved were deployed together. In other words, at time of phase module (LRU) assembly, the database would have been updated to indicate that these particular PCBs were assembled together into a single LRU.

As such, if that information is non-existent in the database (NO at step 116), the second verification step 114 fails, and the method 100 includes the issuance of a lockdown sequence at step 118, and the method 100 ends at step 120. In contrast, if information indicating that the PCBs were actually assembled into a phase module together at the factory together (or manufactured together) (YES at step 116), the method 100 includes no lockdown sequence, and the method 100 ends at step 122 without preventing the power converter to be used.

In another embodiment, the method 100 can include steps that account for situations where the PCBs are being commissioned into the power converter for the first time. As described with respect to FIG. 1B, identification data for the database may be collected in the factory. If the database is field-updatable, there is more security risk (i.e. a technician could mark a counterfeit board combination as OK). As such, in one non-limiting exemplary scenario, if one PCB were to be removed and installed in another machine in combination with other subcomponent PCBs from a second and possibly third LRU, that first PCB would be identified as having been deployed with two other PCBs that are different from those of the other machine. Therefore, counterfeiting machines, even with authentic LRU subcomponents, can be prevented using the method 100.

Figure 1B:
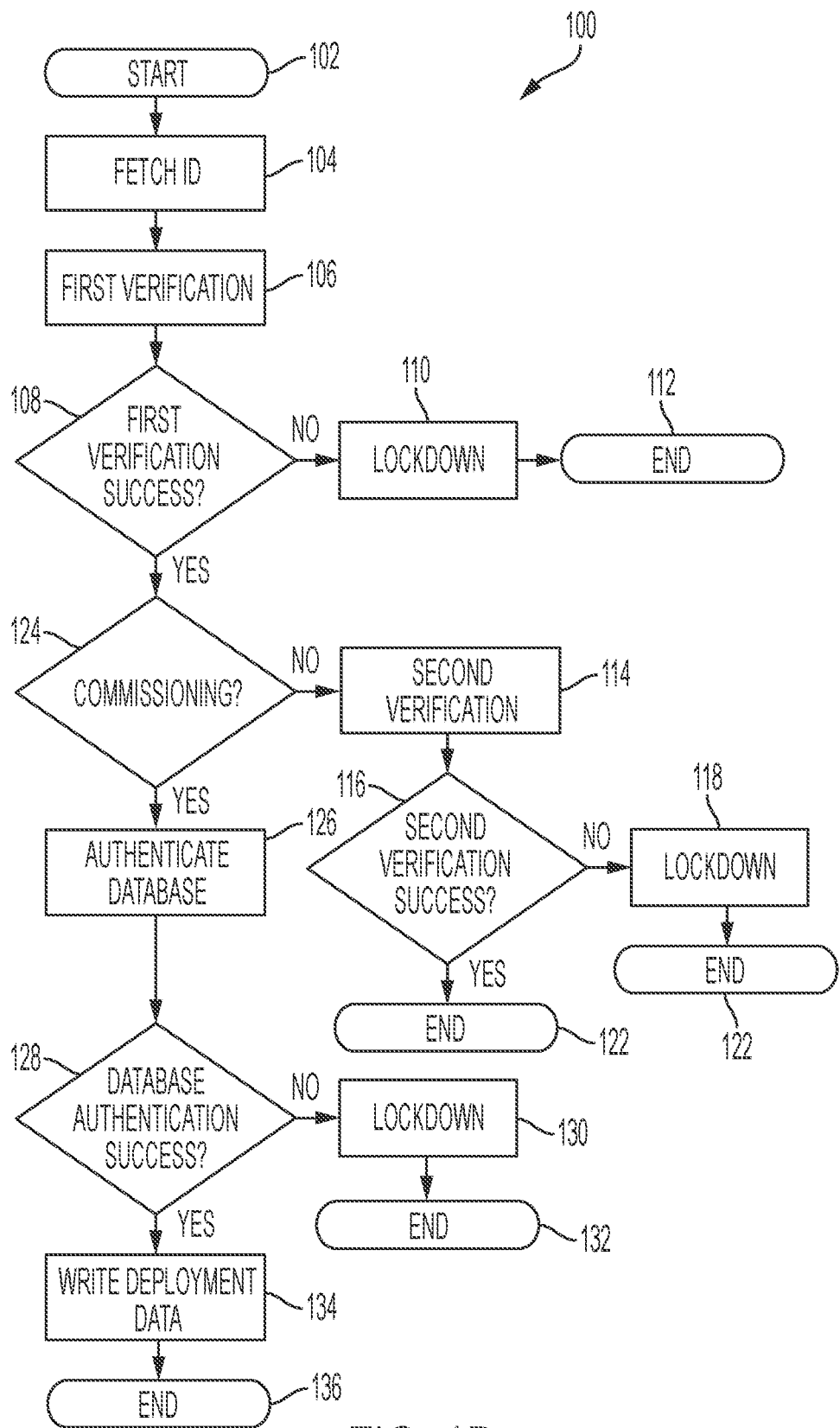
FIG. 1B depicts a flow chart in accordance with several aspects described herein.

For the above-mentioned scenario, the method 100 can be augmented with step 124 as shown in FIG. 1B, which prompts a user to decide whether the particular execution of the method 100 is in the context of a commissioning operation (step 124). If the answer is NO, the method 100 continues as shown in FIG. 1A. If the answer is YES at step 124, the controller may prompt the user (or an accessing system) to provide authentication (step 126) to the database, for example if no information has yet been logged in the database during commissioning. Furthermore, in some embodiments, the database may be encrypted to prevent unauthorized data entry and/or retrieval.

In one embodiment, when the database authentication is successful (YES at step 128), the database may be updated from the site of commissioning or LRU installation (step 134) to indicate that the PCBs whose identification data were retrieved and successfully verified at steps 104 and 108 are deployed together. As such, any subsequent querying of the database for one of these PCBs would indicate that it was deployed together with these particular other two PCBs. As such, if one of the PCBs is found in combination with two others that do not match this record, the second verification step would fail and a lockdown sequence would occur. The method 100 ends at step 136.

In yet another embodiment, identification data for each PCB may be collected at the factory, and the method 100, in that case, would not require field updates as described above. Nevertheless, the method 100 can, in these alternate embodiments, still serve to determine counterfeiting if the retrieved identification data does not match information in the database.

When the database authentication is not successful (NO at step 128), e.g. when an incorrect password and/or credentials are entered, a lockdown command sequence is issued at step 130, effectively preventing use of the power converter. The method 100 then ends at step 132.

Figure 2:
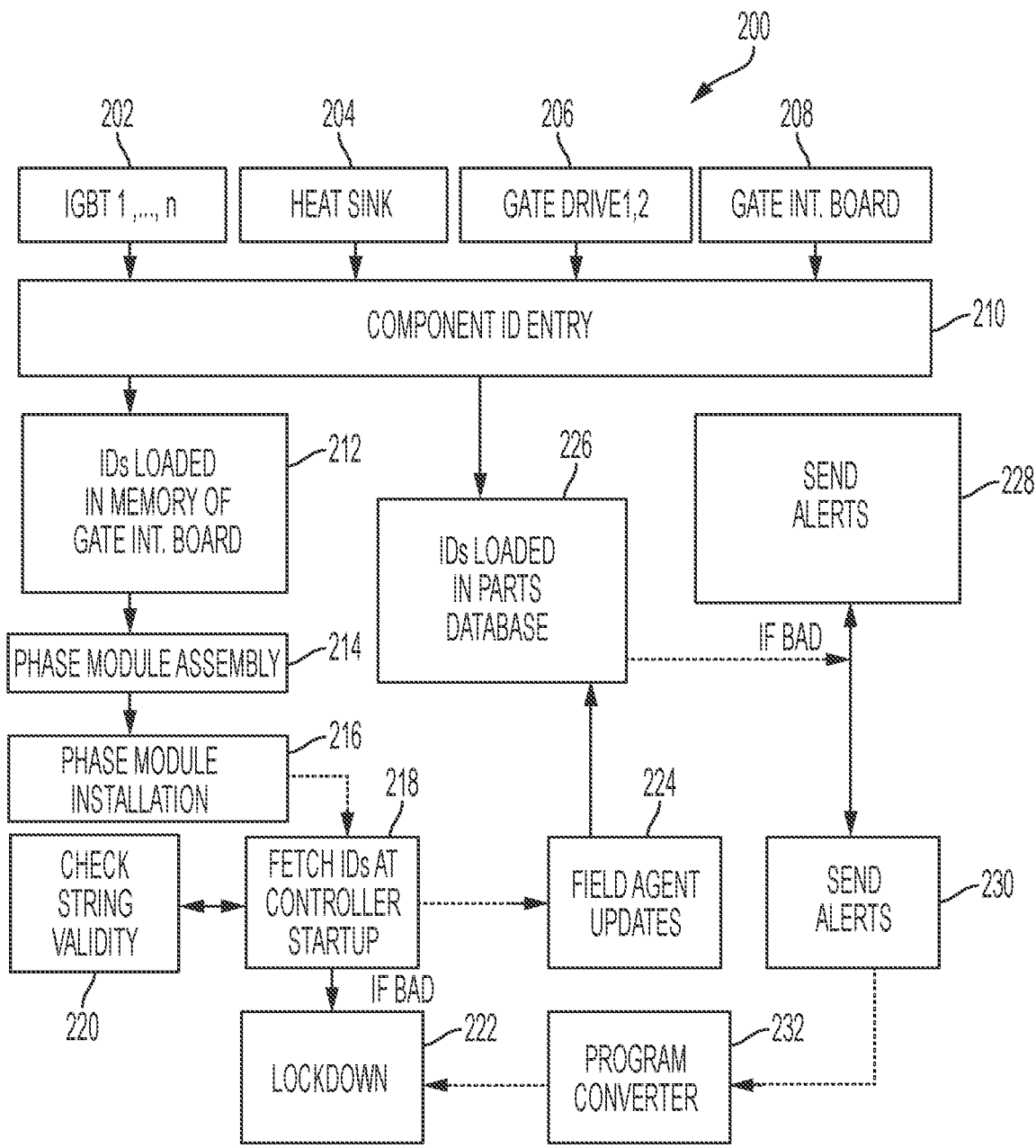
FIG. 2 depicts a flow chart in accordance with several aspects described herein.

FIG. 2 illustrates a use case 200 of the method 100, as generally described in FIG. 1A or FIG. 1B. The use case 200 is described in the context of a power converter that includes a phase module. The phase module can include a plurality of IGBTs 202, a heat sink 204, first and second gate drive PCBs 206, and a gate interface board 208.

Once manufactured, each of the constituent parts of the phase module is assigned a part number, a serial number, or the like, which will later serve as identification data as explained above. In one non-limiting example, each phase module may be assigned a part number and a unique barcode identifier. Upon manufacture, the identification data of each of these components are entered at block 210 into a parts database 226. In one embodiment, the identification data for each component is also loaded in a memory, such as an EEPROM, of the gate interface board 208 (block 212). In another embodiment, each gate drive board and each gate interface board holds its own ID information in an independent ID memory chip. In this alternate embodiment, a check for the specific combination of boards based on their respect ID information may be conducted to provide additional security.

The phase module can then be assembled (block 214) and subsequently installed (block 216) in the power converter. At initialization, a controller associated with the power converter fetches the identification data from the gate interface board and the two gate drive boards 208 of the phase module and performs validity checks (blocks 218 and 220) on the identification data. Such validity checks can include comparing the retrieved identification data with a predetermined string format that is known to be authentic (block 220). If the validity checks fail, the power converter is shut down or prevented to be used (block 222).

Upon fetching the identification data at block 218, a field agent (block 224) can check the ID set for a given LRU against the database of manufactured LRU board combinations. In some embodiments, the field agent may be a network connected controller. If the board combination is not present in the parts database (block 226), then an alert could be sent (block 228), or the field agent could send a lockdown command to the converter (block 222). Furthermore, upon fetching the identification data at block 218, a field agent (block 224) may further update the parts database at block 226, with location data, and/or any other data that associates a particular converter with the phase module installed therein. In another scenario, in case the validity checks fail, the parts database may be updated with information indicating which power converter are using non-OEM parts. As such, alerts may be sent to customers or field engineers (block 228) to notify them of potential counterfeiting or unauthorized parts use. Another option is that the database parts can be continually scanned for information indicating locations of power converters using counterfeited parts, and that information can be sent to field engineers (block 230), who can then program the converter at block 232 for lockdown (block 222) of those power converters that have been found to include unauthorized parts.

Figure 3:
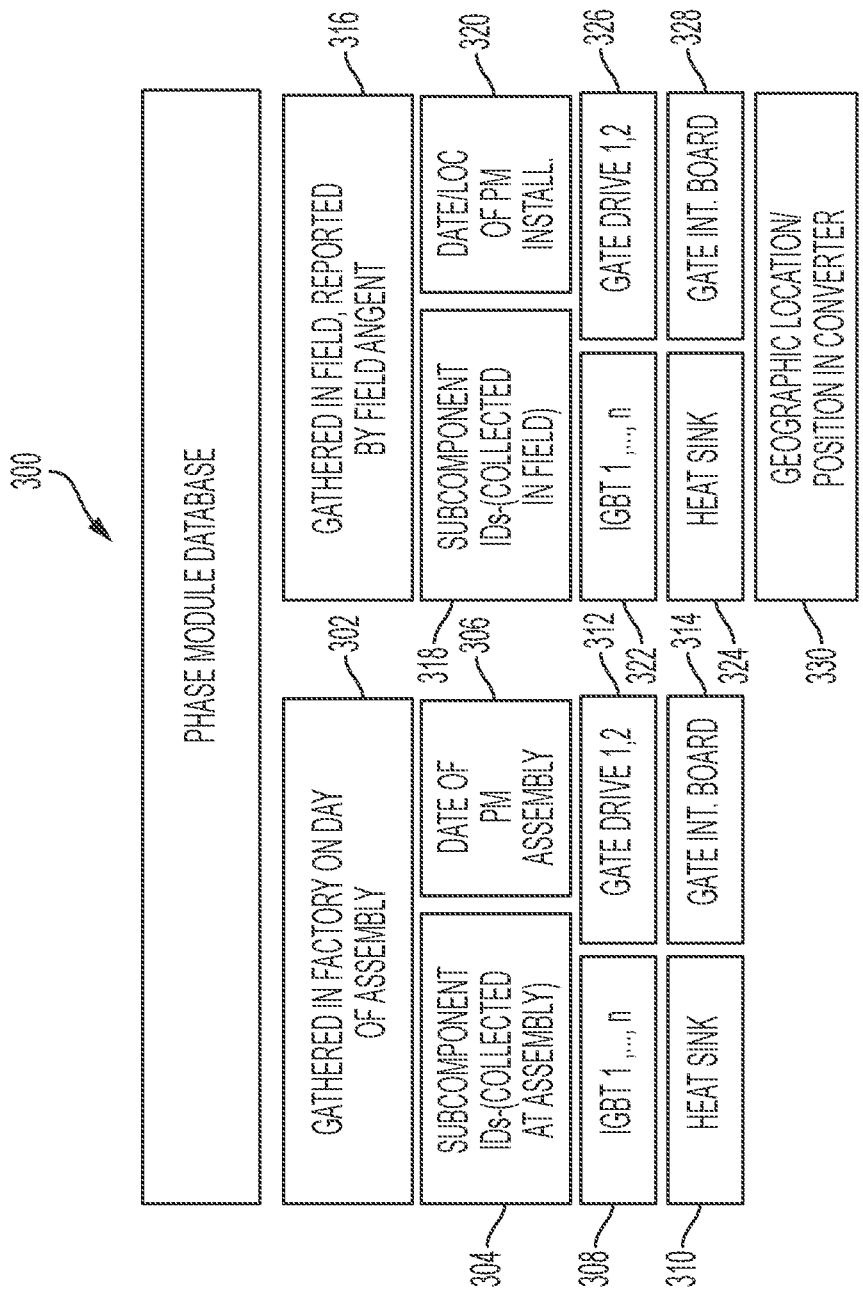
FIG. 3 depicts a database architecture in accordance with several aspects described herein.

FIG. 3 illustrates an example database 300, according to an embodiment. The database 300 includes a first section 302 that stores information gathered at the factory and/or on the day of assembling a phase module (PM). Such information can include sub-component identification data 304 and the date of the phase module's assembly 306. The sub-component identification data may be that of sets of n IGBTs 308 (n being a positive integer greater than or equal to 1), sets of at least two gate drives 312, sets of heat sinks 310, and sets of gate interface boards 314.

The database 300 includes a second section 316 that stores information gathered in the field by a controller and/or reported by a field agent. The second section 316 can include subcomponent identification data 318 that is collected in-field. The identification data can include dates and locations of phase modules installations 320, as entered during commissioning. The sub-component identification data may be that of sets of n IGBTs 322 (n being a positive integer greater than or equal to 1), sets of at least two gate drives 326, sets of heat sinks 324, and sets of gate interface boards 328. The second section 316 may also include geographic location 330 and/or the position in a converter, of the different sub-components whose identification data have been gathered in-field.

In one embodiment, the second section 316 may include fields or sub-sections that mark the identification data collected in-field as authentic or inauthentic based on whether the identification data collected are found in the first section 302 and/or whether the identification data are associated with specific phase modules whose sub-components are grouped accordingly in the first section 302.

Figure 4:
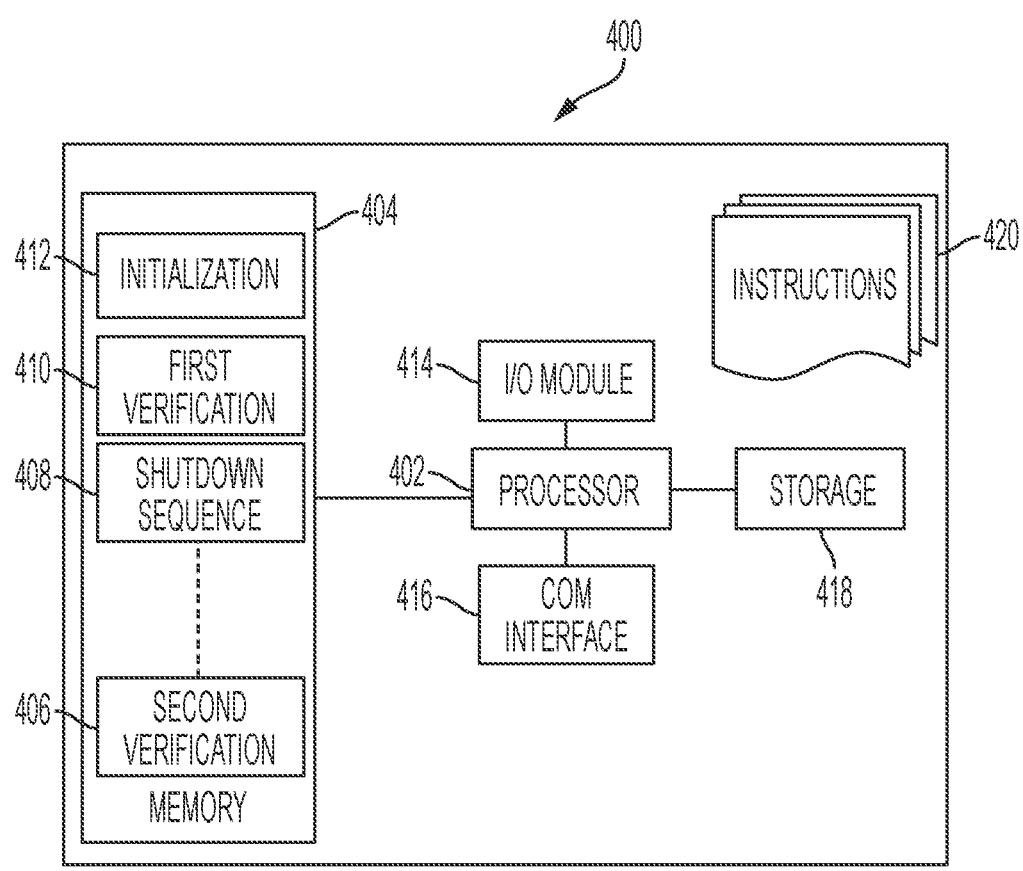
FIG. 4 illustrates a controller in accordance with several aspects described herein.

FIG. 4 shows a block diagram of a controller 400, according to an embodiment. The controller 400 includes a processor 402 that has a specific structure. The specific structure can be imparted to the processor 402 by instructions stored in a memory 404 included therein and/or by instructions 420 that can be fetched by the processor 402 from a storage medium 418. The storage medium 418 may be co-located with the controller 400 as shown, or it may be located elsewhere and be communicatively coupled to controller 400.

The controller 400 can be a stand-alone programmable system, or it can be a programmable module located in a much larger system. For example, the controller 400 can be part of an electric machine, such as a power converter. Or the controller can be a handheld device that can be communicatively coupled to systems and subsystems of the electric machine.

The controller 400 may include one or more hardware and/or software components configured to fetch, decode, execute, store, analyze, distribute, evaluate, and/or categorize information. Furthermore, the controller 400 can include an input/output (I/O) module 414 that can be configured to interface with a plurality of systems and subsystems of the electric machine in order to fetch identification data from one or more systems, subsystems, components or parts of the electric machine.

The processor 402 may include one or more processing devices or cores (not shown). In some embodiments, the processor 402 may be a plurality of processors, each having either one or more cores. The processor 402 can be configured to execute instructions fetched from the memory 404, i.e. from one of memory blocks 412, 410, 408, or memory block 406, or the instructions may be fetched from the storage medium 418, or from a remote device connected to the controller 400 via a communication interface 416.

Furthermore, without loss of generality, the storage medium 418 and/or memory 404 may include a volatile or non-volatile, magnetic, semiconductor, tape, optical, removable, non-removable, read-only, random-access, or any type of non-transitory computer-readable computer medium. The storage medium 418 and/or the memory 404 may include programs and/or other information that may be used by the processor 402.

Furthermore, the storage medium 418 may be configured to log data processed, recorded, or collected during the operation of controller 400. The data may be time-stamped, location-stamped, cataloged, indexed, or organized in a variety of ways consistent with data storage practice.

In one embodiment, for example, the memory blocks 406, 408, 410, and 412 may include instructions that, when executed by the processor 402, cause the processor 402 to perform certain operations. The operations can include, after power-up and initialization of the controller 400 (memory block 412), fetching identification data associated with a set of parts and performing a first verification step on the identification data (memory block 410), for each part in the set. The operations can further include performing a second verification step on the identification data (memory block 406), in response to the first verification step being successful.

The second verification step can include comparing the identification data with data from a database that is communicatively coupled to the controller 400 via the communication interface 416. The database may include information associated with components of the electric machine. Furthermore, the operations can include, in response to one of the first verification step and the second verification step being unsuccessful, issuing a command to disable the electric machine via a shutdown sequence triggered by the instructions stored in the memory block 408.

Generally, the present disclosure provides methods and apparatuses for authenticating components in an electric machine such as a power converter. For example, there is provided a method and an apparatus such that at commissioning of a set of parts in a power converter, a controller gathers power converter PCB part numbers (board ID), verifies the board ID string length and group numbers, and after passing that check, sends the board ID information to be compared against information in a database. This operation aims to confirm a matching set of unique board IDs associated with the parts, in addition to allowing for keeping an inventory of installed parts, as the controller readily provides the identification information associated with the installed parts.

Furthermore, there is provided a method in which a third layer of verification can check an interface board mating with the correct amplifier boards, in a power converter architecture. In one embodiment, the database includes information associated with a unique combination of boards; thus, if the combination of the installed parts is not found in the database, the parts are not authentic, and the controller disables the power converter.

In one example method, there is provided a method for authenticating parts in an electric machine. The method includes fetching, using a controller, identification data associated with a set of parts and performing a first verification step on the identification data, for each part in the set. The method further includes performing a second verification step on the identification data, in response to the first verification step being successful. The second verification step includes comparing the identification data with data from a database that includes information associated with components of the electric machine. Furthermore, the method includes, in response to one of the first verification step and the second verification step being unsuccessful, issuing (by the controller) a command to disable the electric machine.

In the example method, the electric machine may be a power converter, and the set of parts may include at least one gate driver printed circuit board (PCB) and a gate interface PCB. The first verification step may include fetching, from a memory, a PCB part number and verifying a string length and a group number based on the retrieved part number.

The database may be either remote or local to the electric machine, and the electric machine may be a power converter. The database can be either encrypted or unencrypted. Furthermore, the second verification step may include verifying whether the identification information associated with each part is in the database and verifying whether the database includes a record of at least two parts included in the set were commissioned together. And moreover, in response to the record being non-existent in the database, the method may include causing the controller to issue the command to disable the electric machine.

Those skilled in the relevant art(s) will appreciate that various adaptations and modifications of the embodiments described above can be configured without departing from the scope and spirit of the disclosure. Therefore, it is to be understood that, within the scope of the appended claims, the disclosure may be practiced other than as specifically described herein.

What is claimed is:

1. A method for authenticating parts in an electric machine, the method comprising:
    fetching, using a controller, identification data of each part in a set of parts for the electric machine:
    performing a first verification step on the identification data of each part in the set of parts by searching a database for associated manufacturer identification data of each part in the set of parts and performing a comparison there between to determine whether each part in the set of parts is authentic;
    performing a second verification step on the identification data for each part in the set of parts to determine whether a combination of the set of parts is authentic, in response to the determination that each part in the set of parts is authentic, and
    in response to one of the determination that each part in the set of parts is not authentic or the determination that the combination of the set of parts is not authentic, issuing by the controller, a command to disable the electric machine.

2. The method of claim 1, wherein the electric machine is a power converter.

3. The method of claim 2, wherein the set of parts includes at least one gate driver printed circuit board (PCB) and a gate interface PCB.

4. The method of claim 3, wherein the first verification step includes fetching, from a memory, a PCB part number.

5. The method of claim 4, wherein the first verification step includes verifying whether a string length and a group number of the identification data is in a proper predetermined format prior to checking whether the identification data is in the database to determine authenticity of the part, and if unsuccessful then issuing by the controller a command to disable the electric machine.

6. The method of claim 1, wherein the database is either remote or local to the electric machine.

7. The method of claim 1, wherein the database is one of an unencrypted database and an encrypted database.

8. The method of claim 1, wherein the first verification step includes verifying whether the identification information associated with each part is in the database.

9. The method of claim 8, further comprising verifying, based on the identification data, whether the database includes a record of at least two parts included in the set were assembled or manufactured together.

10. The method of claim 9, wherein in response to the record being non-existent in the database, issuing by the controller the command to disable the electric machine.

11. A controller, for authenticating a set of parts in an electric machine, the controller comprising:
    a processor;
    a memory including instructions that, when executed by the processor, cause the processor to perform operations including:
        fetching identification data of a set of parts in the electric machine;
        performing a first verification step on the identification data of each part in the set of parts by searching a database for associated manufacturer identification data of each part in the set of parts and performing a comparison there between to determine whether each part in the set of parts is authentic;
        performing a second verification step on the identification data for each part in the set of parts to determine whether a combination of the set of parts is authentic, in response to the determination that each part in the set of parts is authentic; and
        in response to one of the determination that each part in the set of parts is not authentic or the determination that the combination of the set of parts is not authentic, issuing by the controller, a command to disable the electric machine.

12. The controller of claim 11, wherein the database is either remote or local to the controller.

13. The controller of claim 11, wherein electric machine is a power converter.

14. The controller of claim 11, wherein the set of parts includes at least one gate driver printed circuit board (PCB) and a gate interface PCB.

15. The controller of claim 11, wherein the first verification step includes fetching, from a memory, a PCB part number.

16. The controller of claim 15, wherein the database is one of an encrypted database and an unencrypted database.

17. The controller of claim 15, wherein the first verification step includes verifying whether a string length and a group number of the identification data is in a proper predetermined format prior to checking whether the identification data is in the database to determine authenticity of the part, and if unsuccessful then issuing by the controller a command to disable the electric machine.

18. The controller of claim 11, wherein the first verification step includes verifying whether the identification information associated with each part is in the database.

19. The controller of claim 18, wherein the operations further include verifying, based on the identification data, whether the database includes a record of at least two parts included in the set were commissioned together.

20. The controller of claim 19, wherein in response to the record being non-existent in the database, the operations include issuing the command to disable the electric machine.

* * * * *